(No Model.)

E. SHAW.
DISH CLEANER.

No. 603,580. Patented May 3, 1898.

Witnesses:
A. C. Harmon
Walter O. Lombard

Inventor:
Edgar Shaw.
by Crosby Gregory
attys.

UNITED STATES PATENT OFFICE.

EDGAR SHAW, OF SWAMPSCOTT, MASSACHUSETTS.

DISH-CLEANER.

SPECIFICATION forming part of Letters Patent No. 603,580, dated May 3, 1898.

Application filed November 18, 1897. Serial No. 658,891. (No model.)

*To all whom it may concern:*

Be it known that I, EDGAR SHAW, of Swampscott, county of Plymouth, State of Massachusetts, have invented an Improvement in Dish-Washers, of which the following description, in connection with the accompanying drawings, is a specification, like letters on the drawings representing like parts.

One of the most disagreeable features of housework is washing dishes by hand, for the hands have to be submerged in the hot water, which soon becomes dirty and greasy. The skin is made red and tender by the hot water, and the dirt and grease roughen the skin and make it crack or chap.

To wash dishes thoroughly and remove all the dirt and grease, the water should be boiling hot; but it cannot be used boiling hot when the hands are inserted, and consequently the water is cooled so that the hands can be put into it with safety.

I have devised an apparatus by which dishes may be thoroughly washed without putting the hands into the water and the water may be used boiling hot, the use of the apparatus also enabling the dishes to be washed and gotten out of the way quicker than when washed by hand in the old way. The dishes may be washed in boiling water and then be rinsed in clean boiling water, and be then removed to dry without wiping, they drying quickly due to the heat put into the dishes by the boiling water.

In my invention I use a revoluble covered dish-pan open at bottom and set into a reservoir of boiling-hot water, the water in the reservoir being under the control of the pump located outside the said reservoir and dish-pan, the pump having a discharge-pipe which is led therefrom into the reservoir and up into the center of the dish-pan, so that the latter is free to be rotated about said discharge-pipe. The lower end of the dish-pan is sustained on suitable rests in the reservoir, and the top of the dischage-pipe has a perforated nozzle through which the hot water is discharged onto the dishes in the revolving dish-pan. Between the cover of the dish-pan and the perforated nozzle I place a spreader, against which some of the water discharged from the nozzle strikes and is thrown outwardly and spread onto the dishes.

Figure 1:
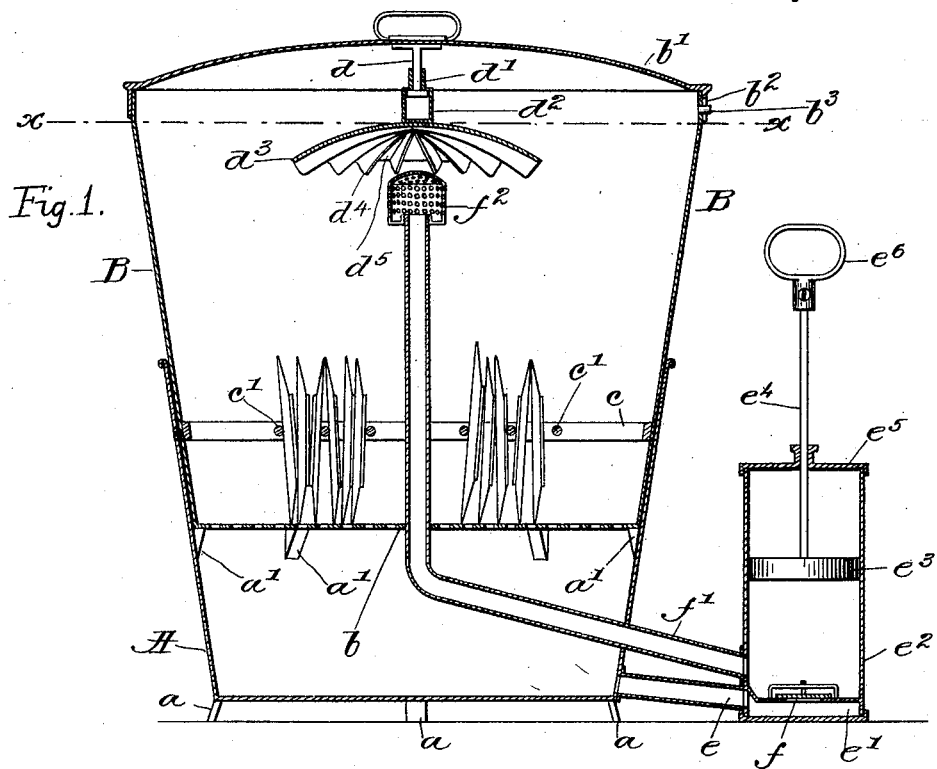
Figure 2:
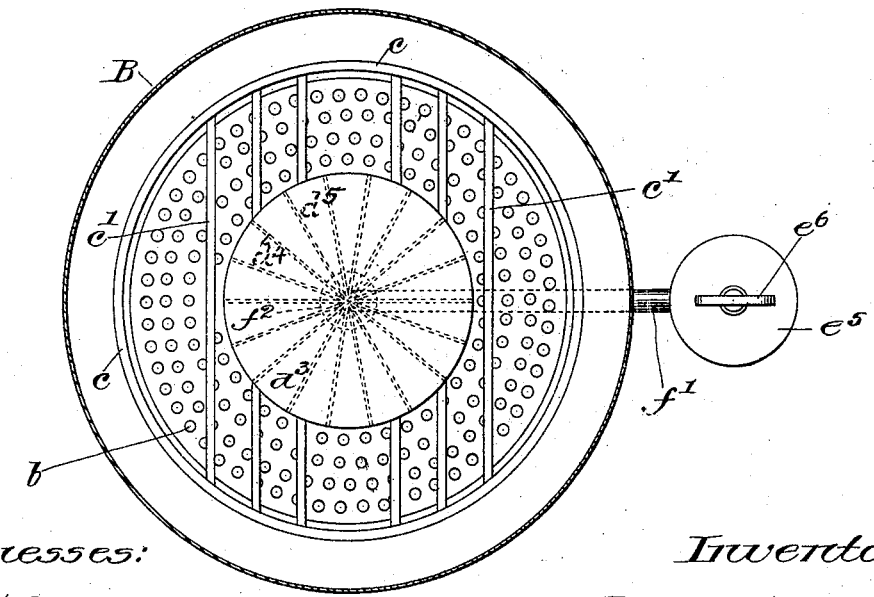

Figure 1 in vertical section represents a dish-washing apparatus embodying my invention, and Fig. 2 is a section below the dotted line $x$, Fig. 1.

The hot-water reservoir A has a suitable base or legs $a$ to rest on a table, and at its interior the reservoir has suitable rests $a'$ to sustain the lower end of the dish-pan B, the said pan entering said reservoir. The lower end of the pan is provided with a perforated bottom $b$, and the top of the pan is closed by a cover $b'$, having a suitable flange to engage the top of the pan, said flange, as herein shown, being slotted, as at $b^2$, to engage the pin or projection $b^3$ of the pan and prevent the rotation of the cover on the pan. The interior of the pan is provided with a suitable rack composed of a rim $c$ and cross-bars $c'$, the plates being stood up between the cross-bars.

The cover $b'$ has extending through it to its under side a headed stud $d$, which supports loosely a collar $d'$, to which is attached a sleeve $d^2$, said sleeve being connected to or forming part of a spreader $d^3$, herein shown as a circular umbrella-shaped plate having ribs $d^4$, between which are grooves or channels $d^5$.

The hot-water reservoir A has an outlet $e$, which leads into a well $e'$ at the bottom of a pump-cylinder $e^2$, said cylinder containing a piston $e^3$, the piston-rod $e^4$ of which is extended out through the head $e^5$ of the pump-cylinder, so that said piston may be readily used by the operator engaging the handle $e^6$ thereof.

The top wall of the well $e'$ has a clack-valve $f$, and the wall of the pump has leading from it into the reservoir A, centrally up through the bottom $b$ of the dish-pan B, a discharge-pipe $f'$, the upper end of said discharge-pipe having a suitable perforated nozzle $f^2$.

By moving the piston the water placed in the reservoir A will be drawn into the pump and forced therefrom through the discharge-pipe $f'$ and the nozzle $f^2$, the water escaping from the sides of the nozzle being thrown laterally onto the plates and that from the top of the nozzle striking the spreader $d^3$, from which it is thrown again in all directions toward the walls of the pan B.

I find that the dishes are washed more thoroughly by revolving the pan B in the reservoir A. The person using the apparatus will therefore place one hand upon the cover near its junction with the pan and will gradually turn the pan in the reservoir.

With this apparatus boiling water may be used both for washing the dishes in the first instance and for rinsing the dishes afterward.

Were the pump used inside of the dish-pan the pan could not be rotated, and the space occupied by the pump precludes the introduction into the pan of but the proper amount of dishes.

This apparatus may be used to wash plates, cups, or any other usual dishes.

Having described my invention, what I claim, and desire to secure by Letters Patent, is—

1. In a dish-washing apparatus, a reservoir, a dish-pan sustained therein revolubly and having means for holding dishes on edge, combined with the cover, and the spreader supported thereby, a pump having outlet and discharge pipes, the said discharge-pipe being extended through the said reservoir and centrally through the bottom of said dish-pan and provided with a nozzle, the dish-pan being revoluble about the said discharge-pipe, substantially as described.

2. The reservoir A having rests $a'$, the dish-pan B inserted in said reservoir and sustained by said rests, said dish-pan having a perforated bottom and a closed cover, and having means for sustaining plates on edge, combined with a spreader suspended from the lower side of said cover, a pump located outside the reservoir and pan having an inlet $e$, and a discharge-pipe $f'$ extended through the reservoir and centrally up into the dish-pan and provided with a nozzle, substantially as described.

In testimony whereof I have signed my name to this specification in the presence of two subscribing witnesses.

EDGAR SHAW.

Witnesses:
GEO. W. GREGORY,
EMMA J. BENNETT.